F. W. EBELING.
SAFETY AIR RELIEF VALVE.
APPLICATION FILED OCT. 13, 1915.
1,229,726.
Patented June 12, 1917.
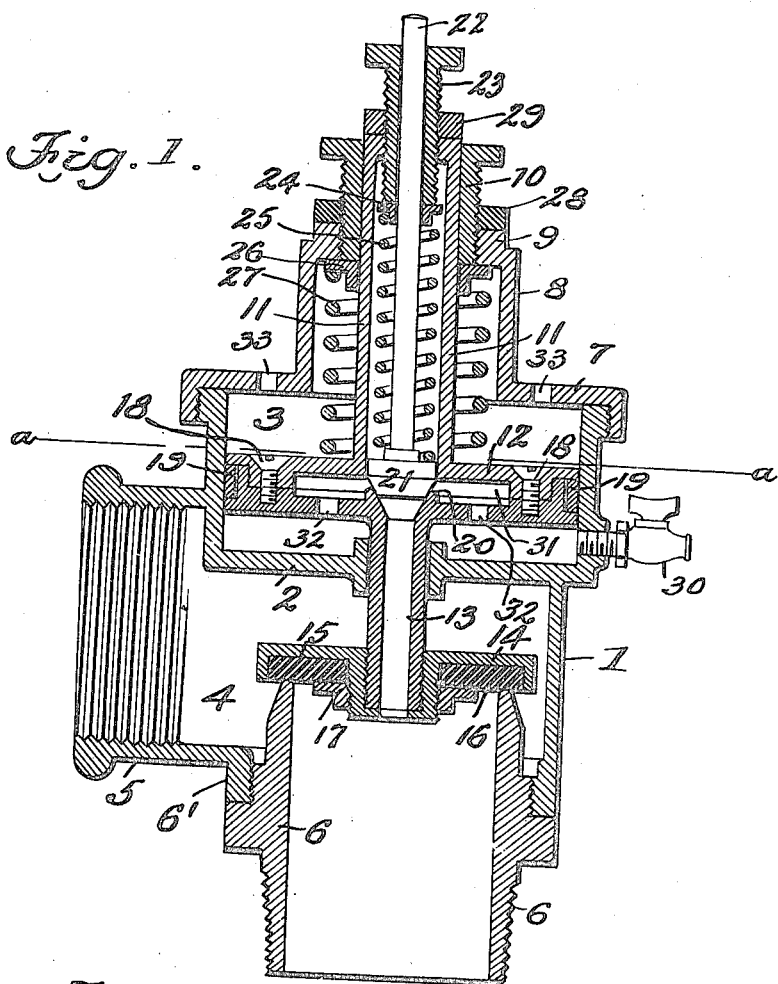
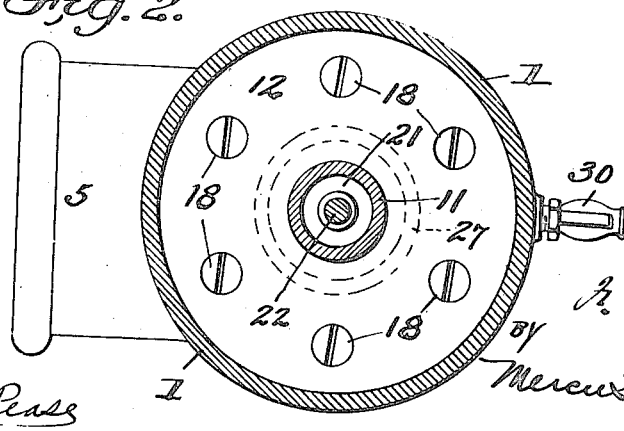
Witnesses
M. E. Hitchcock
J. Arthur Pease
Inventor
F. W. Ebeling
by
Mercer & Blondel
Attorney

UNITED STATES PATENT OFFICE.

FREDERICK WILLIAM EBELING, OF HOBOKEN, NEW JERSEY, ASSIGNOR TO KING & WOTHERSPOON, INCORPORATED, OF NEW YORK, N. Y.

SAFETY AIR-RELIEF VALVE.

1,229,726.

Specification of Letters Patent.    Patented June 12, 1917.

Application filed October 13, 1915. Serial No. 55,630.

*To all whom it may concern:*

Be it known that I, FREDERICK WILLIAM EBELING, a citizen of the United States, residing at Hoboken, in the county of Bergen and State of New Jersey, have invented certain new and useful Improvements in Safety Air-Relief Valves, of which the following is a specification.

The invention relates particularly to positive-displacing quick-acting safety air-relief valves, and the object of the invention is to provide a device for automatically and quickly relieving excess air pressure on a tank or air compartment of a vessel, and in such places as may be required in the art of compressed air engineering, such as upon submerged or stranded vessels, as in salvage operations, and also upon such vessels when testing the several compartments thereof under air pressure.

The invention consists in providing a valve casing having a horizontal partition providing upper and lower compartments, the upper compartment constituting a cylinder in which operates a piston having a hollow stem extending downwardly therefrom, through the partition, and having its lower end provided with a valve designed for engagement with a valve seat at the intake end of the valve casing, the said hollow stem having an auxiliary valve operating therein designed to seat upon the upper end of said hollow stem. Springs are employed for holding the valves to their seats, the arrangement being such that when excess pressure is placed upon the tank, or compartment being tested, the auxiliary valve will first lift from its seat so that the air will act upon the main valve, and thus lift the main valve from its seat, whereby to permit the escape of the necessary quantity of the compressed air from the tank or compartment being tested or supplied with compressed air, means being provided for regulating the tension of the springs, and also for taking care of the air that might escape past the valves.

These and other features germane thereto constitute the invention, as will be hereinafter fully described and then claimed.

In the drawing, illustrating the invention, in the several figures of which like parts are similarly designated, Figure 1 is a vertical longitudinal section drawn through the valve. Fig. 2 is a horizontal section drawn on the line *a—a* of Fig. 1.

1 designates the casing of the valve having a horizontal partition 2, which divides the casing into an upper compartment 3, and a lower compartment 4, said lower compartment being open to the atmosphere through a collar 5 having internal threads for the attachment of a hose or pipe line when the device is used in connection with submerged objects. The lower end of the valve casing terminates in a threaded collar 6' in which is screwed a sleeve 6, the upper end of which is ground to provide a valve seat for a valve hereinafter described. The lower end of the sleeve is threaded to receive suitable connections for connecting the valve to the tank or compartment to be tested or blown.

The upper end of the casing is closed by a cap 7 having an upwardly extending collar 8, which terminates at its upper end in a threaded nipple 9, in which is threaded an adjusting screw plug or collar 10 through which operates a sleeve 11 formed upon one section of a piston 12, from the lower side of which extends a hollow stem 13, which operates through a central bore formed in the partition 2. The lower end of the stem 13 is threaded to carry a valve 14, the under side of which is formed with a recess 15 to receive a rubber gasket 16, which is designed to engage and seat upon the upper end of the sleeve 6, the said valve having a central externally threaded sleeve to receive a flanged nut 17 for holding the gasket in place.

The piston 12 is preferably constructed of two sections, the upper section carrying the sleeve 11, and the lower section carrying the hollow stem 13, the two sections thereof being connected together by screws 18, and the periphery of the lower section is grooved to provide, in conjunction with the upper section, an annular recess to receive a piston ring 19. The lower section of the piston is formed with an annular rib 20 surrounding the recess or bore in the stem 13, and the upper end of the annular rib is ground to provide a seat for an auxiliary valve 21. The stem 22 of the valve 21 extends upwardly through the sleeve 11 and through an adjusting screw plug 23 threaded in the upper end of said sleeve 11, and resting upon the lower end of the adjusting screw plug is a disk 24 between which, and the upper face of the auxiliary valve 21, is interposed an expansion spring 25, employed for holding the auxiliary valve 21 to its seat. Surrounding the cylinder 11, and resting against the lower end of the adjusting screw plug or collar 10, is a disk 26, between which, and the upper section of the piston 12, is interposed a spring 27 for holding the main valve 14 upon its seat. As will be hereinafter explained, the spring 27 is stronger than the spring 25 for holding the auxiliary valve 21 to its seat.

28 and 29 designate locking nuts threaded upon the adjusting screw plugs 10 and 23, whereby to hold them into the position in which they have been adjusted.

30 designates a pet cock screwed into the side of the casing below the normal position of the piston, and serves the purpose of venting the chamber or compartment below the said piston so as to permit the escape of air, when the valve 21 is seated, and of any foreign matter that may have accumulated in the cylinder below the piston, as will be readily understood. The piston 12, as shown, is formed with a recess 31, and the lower side or section of the piston is provided with ports 32 to permit the escape of air into the chamber below the piston when the auxiliary valve 21 is lifted from its seat, as will be hereinafter described. 33 designates vent ports formed in the cap 7.

The operation of the valve is as follows:—

In testing a tank or a compartment by compressed air, the sleeve 6 of the valve casing is screwed into one of the walls of the tank or compartment, the valves 14 and 21 having previously been set against the maximum pressure under which the tank or compartment is to be subjected. Air under pressure is then let into the compartment or tank in the usual manner, so that, in the event of excess pressure being applied upon the tank or compartment, the auxiliary valve 21 will be first unseated to allow a quantity of the air from the tank or compartment to escape past the valve 21 into the recess 31, and through the ports 32 into the lower end of the compartment 3, to thus force the piston 12 upwardly, and to unseat the valve 14, it being understood, that since the area of the piston 12 is considerably greater than that of the valve 14, (and which, combined with the area of the valve 14), the pressure will be sufficient to instantly overcome the tension of the spring 27, and thus raise the valve 14 from its seat, thus allowing the excess air in the tank or compartment to escape past the valve 14 and through the sleeve 5 of the casing.

It will be understood that the spring 25 is set at such a tension to permit the valve 21 to be unseated the moment the slightest excess pressure is put upon the tank or compartment being tested or blown; and further, that the moment the valve 21 is unseated, air from the tank or compartment under pressure (as the case may be) will be permitted to enter the lower end of the cylindrical chamber 3, and that owing to the large area of the piston 12, combined with that of the area of the valve 14, sufficient pressure will be exerted upon the piston and valve to overcome the tension of the spring 27, to thus lift the valve 14 from its seat, and to allow the excess air pressure in the tank or compartment to escape past the valve 14, through the exit of the casing. It will be further understood, that immediately after the valve 21 is lifted from its seat, and the air permitted to escape into the lower end of the cylindrical chamber 3, to unseat the valve 14, the valve 21 will be first seated, and then when the pressure in the tank or compartment is reduced below that of the tension of the spring 27, the said spring 25 then becomes an adjunct to the spring 27, so that the combined force of the springs 25 and 27 will then seat the valve 14 against the pressure of air in the tank or compartment the moment the pressure in the latter is reduced below that of the said springs.

It will be appreciated that when my improved relief valve is used in connection with an apparatus for blowing a compartment of a submerged vessel, the sleeve 6 will be connected to a pipe line extending from the compartment from which the water is to be blown, so that the valve casing may be held above the surface of the water and thus be readily accessible to the operators.

It will thus be seen that I provide an exceedingly simple and efficient relief valve that will be found particularly useful, not only in testing tanks or compartments under air pressure, but which will be found equally advantageous in use upon tanks or compartments of submerged vessels, whereby the pressure imposed upon the tank may be automatically regulated and the destruction of the tank or compartment thus avoided.

What I claim is:—

1. In a positive acting safety relief valve, a casing comprising an upper and a lower compartment, the upper compartment adapted to receive a hollow spring actuated piston and a piston rod, ports arranged in the hollow piston and communicating with said upper compartment, a hollow stem connected to the said piston and adapted to operate a valve in the lower compartment, and a spring actuated valve in the hollow piston coacting with a valve seat in said piston to close communication between the hollow stem and the ports in the piston.

2. In a positive acting safety valve, a casing comprising an upper and a lower compartment, the upper compartment adapted to receive a hollow spring actuated piston and a piston rod, ports arranged in the hollow piston and communicating with said upper compartment, a hollow stem connected to the said piston and adapted to operate a valve in the lower compartment, a spring actuated valve in the hollow piston coacting with a valve seat in said piston to close communication between the hollow stem and the ports in the piston, and a venting device in the upper casing for venting the chamber below the said piston.

In testimony whereof I have hereunto set my hand this 8th day of October, A. D. 1915.

FREDERICK WILLIAM EBELING.

Witnesses:
R. S. BLYDENBURGH,
E. REINHARDT, Jr.